METHOD AND APPARATUS FOR RECORDING AND DETECTING INFORMATION

Filed Dec. 21, 1967 3 Sheets-Sheet 1

*INVENTOR*
GEORGE R. SANTANA

BY John H. Holcombe

ATTORNEY

Oct. 13, 1970 G. R. SANTANA 3,534,344

METHOD AND APPARATUS FOR RECORDING AND DETECTING INFORMATION

Filed Dec. 21, 1967 3 Sheets-Sheet 2

United States Patent Office 3,534,344

Patented Oct. 13, 1970

3,534,344

METHOD AND APPARATUS FOR RECORDING AND DETECTING INFORMATION

George R. Santana, Saratoga, Calif., assignor to International Business Machines Corporation, Armonk, N.Y., a corporation of New York Filed Dec. 21, 1967, Ser. No. 692,439

Int. Cl. G11b *5/00, 5/48, 23/18*

U.S. Cl. 340—174.1 26 Claims

ABSTRACT OF THE DISCLOSURE

Method and apparatus for recording and detecting information and deriving therefrom position information for use with a track following servo system. Alternate odd and even servo tracks are magnetically recorded with oppositely-poled, constant fluxes, subject to periodically-occurring data-frequency flux reversals. The flux reversals may be of opposite phase for odd and even tracks and are physically alternated along the direction of motion. A servo read head is properly centered when it is located half way between adjacent tracks such that the data frequency signals received from the tracks are equal. The data frequency pulse signals as read are separated according to the polarity of the flux reversals and compared. The net signal resulting from the comparison is the servo position error information.

BACKGROUND OF THE INVENTION

Field of the invention

The invention relates to methods and apparatus for recording and detecting information, and more particularly to methods and apparatus for recording and detecting position information.

Description of the prior art

Track following servo systems and position-detecting means are becoming more important and requirements thereof becoming more exacting in many fields, such as machine tool control. Another field, one which is now beginning to realize and employ the advantages of track following servo systems, is the field of data processing, and more particularly, data storage.

As data storage systems have developed, each improvement thereto has been directed to optimizing the compromise between increasing the areal density of data, lowering the access time required to find desired data, and cost reduction. As a result of this development, most data storage devices employ a storage medium comprising a surface upon which may be recorded parallel linear tracks of data. This data is recorded or reproduced by means of one or more transducers with means for causing relative movement between the transducer or transducers and the storage medium, such that a transducer follows along a corresponding track.

Data storage systems employed as part of data processing apparatus require very high areal densities. To attain such high densities, the tracks are made closer and closer together with each new development and made narrower in width, so that a great number of tracks may be fitted onto a single storage medium. Prior art data storage systems hold the transducer in a fixed lateral position with respect to a track by mechanical means. In all applications where the media are interchangeable or the transducer may be moved laterally from track to track, the mechanical positioning means may not always accurately align the transducer with the desired track. Therefore, the tracks must be spaced apart sufficiently to allow for misalignment caused by manufacturing tolerances.

The distance between tracks should be sufficiently great to prevent the transducer from reading an adjacent track along with the desired track when so misaligned. To allow the tracks to be placed closer together, present development is moving toward closed-loop, track following servo systems to maintain the transducer positioned along the corresponding track.

Previously, track following servo systems have not been advantageous in data storage systems due to the high cost thereof. The high cost is a result of the special equipment required and the critical characteristics of the equipment. Many possible servo systems have been proposed, but all suffer from the excessive cost required to implement the system properly.

Many examples of such prior service systems are evident in the art. One example is a system employing odd and even servo tracks of differing frequencies. A servo transducer is centered when it is located half way between adjacent tracks such that the signals received from the tracks are equal. In such a system, the servo transducer cannot be an ordinary data transducer because of the wide and precision frequency response necessary to provide accurate servo signals. Likewise, the circuitry for separating and detecting the two frequencies and for determining the relative amplitudes thereof must be accurately balanced and provide a precision response for each of two different frequencies. Satisfying these requirements necessitates the use of expensive transducers and circuitry.

In another example, the odd and even servo tracks are recorded at the same frequency, but in opposite phase. Extreme precision is thus required to record each track so as to be continually exactly opposite in phase to the adjacent track. Further, precision timing means is required to detect the phase of the predominant signal and determine the direction to drive the servo transducer to properly center it between the servo tracks. Again, the equipment required must be extremely expensive.

In still another example, bursts of servo data are recorded at alternate times along the odd and even tracks and a separate timing track and transducer are provided. The timing track and transducer operate appropriate gating circuitry to indicate whether a detected burst signal is that of an odd or an even track. This system allows use of a data servo transducer, but still requires precision in recording the various tracks so that all bursts are properly aligned with the corresponding time signals on the timing track. An additional cost requirement is that two separate transducers are required, one being the movable servo transducer and the other being a fixed transducer for detecting the timing track. Additionally, complex circuitry is required for properly gating, under control of the timing signals, the various bursts of data to the proper side of a comparison circuit, depending upon whether the servo transducer is between an odd and an even track, or between an even and an odd track. This is required to determine the proper direction to move the servo transducer to properly center it between the servo tracks. Again, the additional transducer and associated circuitry, plus the complex switching circuitry required, makes the system quite expensive.

Still other systems have been described by the prior art, but all are rather expensive to implement in physical hardware, or are subject to great inaccuracy when not properly implemented.

SUMMARY

An object of the present invention is to provide simple and less expensive means for providing position information of the accuracy required for use in a track following servo system of a data storage device.

Another object of the present invention is to provide a simplified method for generating accurate position information.

Briefly, the invention comprises a method and apparatus for generating position signals. The apparatus comprises a plurality of tracks, each track having a normal predetermined polarity subject to periodically occurring sets of polarity reversals, adjacent tracks being of opposite predetermined polarity. Transducing means is provided for detecting the polarity reversals, wherein the amplitude of the detection is directly related to the later distance of the transducer from the center of the track having the polarity reversal. Conversion means converts each set of polarity reversals into signals of positive or negative polarity depending upon the direction of the first polarity reversal of the set of polarity reversals. Comparison means compares the amplitudes of the positive and negative polarity signals and generates position signals indicating the polarity and amplitude of the difference between positive and negative polarity pulses.

The method comprises a plurality of steps including fashioning a plurality of adjacent tracks, such that a line centered between two adjacent tracks represents a constant positional indication, and each track is generated with a predetermined normal polarity subject to periodically occurring sets of polarity reversals, adjacent tracks having opposite predetermined polarity. Another step comprises sensing, along a line essentially parallel to the centered line, the polarity reversals of the adjacent tracks wherein the sensing amplitude is directly dependent upon the lateral distance from the sensing line to the center of the track having the sensed polarity reversal. The sets of polarity reversals are then separated into signals of opposite polarity dependent upon the first polarity reversal of each set. The oppositely-poled signals are then compared to derive a net difference, the amplitude and polarity of the difference thereby indicating the distance and direction of the distance of the sensing line from the centered line.

The primary advantage of the present invention is that the tracks do not need to be made with exact phase precision and alignment as do the prior servo tracks. Rather, the sets of phase reversals only need be generally interlaced without precise alignment.

DESCRIPTION OF THE PREFERRED EMBODIMENTS

As discussed above, track following servo systems and position-detecting means are becoming more important in many fields. Further, the uses of such systems expand, the requirments thereof become far more exacting. Examples of position detecting systems abound. The example chosen for illustratiton of the invention is that of a data storage system employing a disk file 10. Other examples of data storage devices comprise tape drives, drums and strip files. The subject invention may be utilized with any of these data storage systems employing relative motion between a transducer and a data storage medium for recording and reading one or a plurality of parallel tracks. The subject invention may also be utilized with any other position detection system where applicable.

Figure 1:
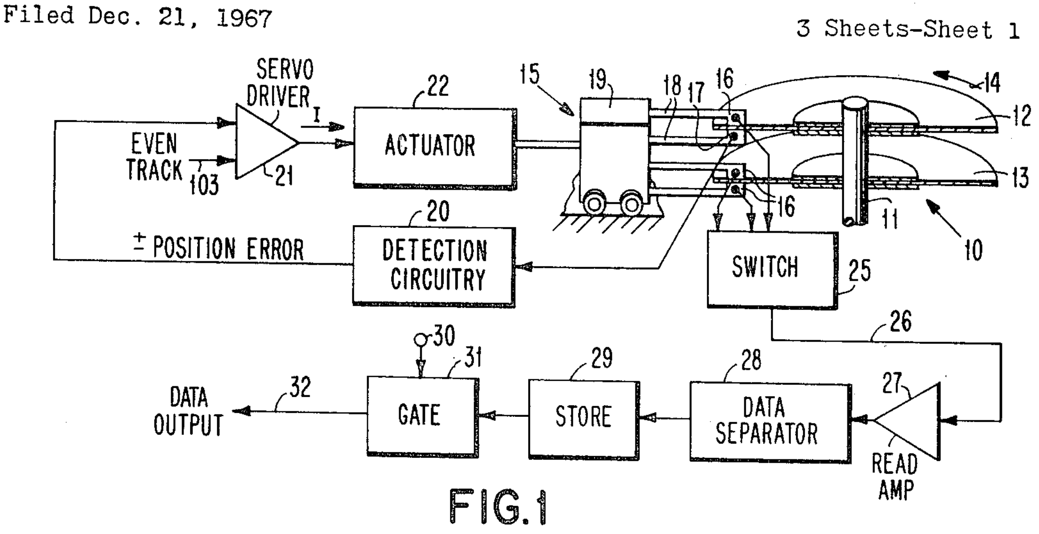
FIG. 1 is diagrammatic illustration of data storage apparatus having a track following servo system including an embodiment of the subject invention.

An embodiment of a disk file 10 employing the subject invention is shown in FIG. 1. In the arrangement shown, the disk file 10 comprises a central shaft 11 which supports disks 12 and 13 perpendicular to the axis thereof and axially aligned therewith. A motor (not shown) rotates shaft 11 in the direction of arrow 14. The disks 12 and 13 comprise a planar aluminum substrate coated on both sides with a thin magnetizable film. A ganged transducer head assembly 15 includes a plurality of separate transducers 16 for the magnetic recording and reproducing of data on the associated surfaces of disks 12 and 13. Also included in head assembly 15 is a separate servo transducer head 17. All of the transducers are suspended by support arms 18 from carriage 19 so as to be accurately aligned with one another and with respect to disks 12 and 13. An example of a disk file having plural transducers and recording surfaces is the IBM 2311 Disk Storage Drive with an IBM 1316 Disk Pack. The 1316 Disk Packs are interchangeable and may be removed from one storage drive and placed on another.

With the carriage 19 stationary, the transducers 16, 17 each trace along a circular track on the corresponding disk surface. The tracks all lie in a common cylinder having a central axis concentric with shaft 11. Movement of carriage 19 along a radial line extending from shaft 11 changes the radius of the cylinder traced by the tranducers 16, 17. Accurate positioning of the carriage 19 is determined from the servo positioning signals detected by servo transducer 17, as will be explained hereinafter. These signals are supplied to position error detection circuitry 20. Two examples of this circuitry will be described hereinafter. The circuitry provides as an output a position error signal indicating the direction and amplitude of the position error. This output is supplied to a servo driver 21. The servo driver provides an output current I proportional to the voltage output of the detection circuitry 20. Current from the servo driver 21 drives a servo actuator 22. The servo actuator 22 may be of any suitable type for moving carriage 19 toward or away from shaft 11 in response to the output current from servo driver 21. The position error servo system operates to cause the ganged transducers 16, 17 to accurately follow the desired servo track on the servo surface of disk 12. Hence, servo transducer 17 and the corresponding data transducer 16 are maintained in alignment with the servo track.

The accessing of a particular servo track is accomplished by a separate accessing servo system which forms no part of the present invention.

Data transducers 16 each detect data recorded on the corresponding surface of rotating disks 12 or 13. A specific transducer is selected by means of switching circuitry 25. The switching circuitry may comprise any suitable switching network for selectively interconnecting the output wires of one of the transducers 16 to line 26. Line 26 is connected to a read amplifier 27, which amplifies the output of switching means 25. The amplified signal is then supplied to a data separator 28. The data separator 28 comprises circuitry for analyzing the output of read amplifier 27 and decoding those signals into binary "ZERO" or "ONE" data bits at a specified clocking rate. An example of such a data separator is presented in U.S. Pat. 3,197,739, E. G. Newman, "Magnetic Recording System" issued July 27, 1965.

The output of data separator 28 is transmitted to a storage means 29. Storage means 29 comprises any suitable means for storing the data received from data separator 28 until its transmission is requested by a receiving device. The storage device 29 may receive and transmit the data serially or, alternatively, may receive the serial data and convert it to parallel data which is transmitted. Many examples of such storage registers exist in the prior art. The receiving device operates the controlling input 30 of a gate circuit 31 to transmit the data from storage means 29 to the receiving device over data output 32.

Figure 2:
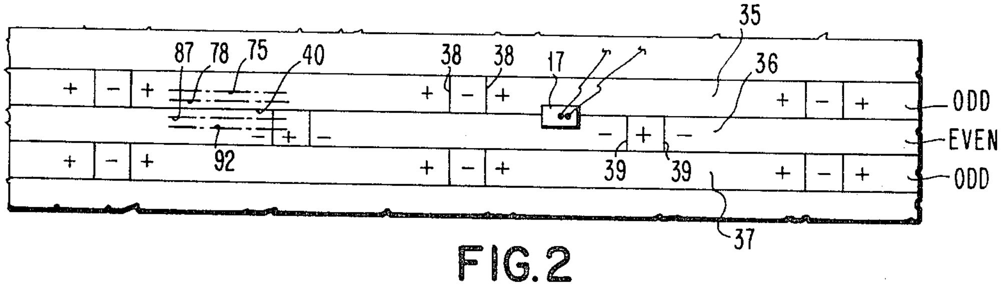
FIG. 2 is a representation of reference patterns arranged in accordance with the present invention.

FIG. 2 shows a representation of position-indicating reference patterns arranged in accordance with the present invention. Three position-indicating tracks 35–37 are illustrated. Those tracks represent three of a plurality of alternating odd and even circular concentric servo tracks recorded on the lower surface of disk 12. Various portions of track 35, for example, are marked with either a plus (+) or a minus (−). Each positive portion represents an area of magnetization of the surface of disk 12 in a first direction with respect to servo transducer 17, and the minus portions represent areas recorded in the opposite direction. The vertical lines dividing the plus and minus portions of track 35 therefore represent transitions between the two states. Tracks 35 and 37 are odd tracks and have a normally positive flux, subject to periodically-occurring sets of two flux reversals, represented by the vertical lines such as lines 38. The even tracks, however, are normally of minus magnetic polarity, subject to periodically-occurring sets of two flux reversals, also shown by vertical lines such as lines 39. The sets of flux reversals of the even tracks are arranged to alternate with respect to the sets of flux reversals of the odd tracks.

The servo transducer 17 is shown superimposed over the recorded servo tracks in FIG. 2. The servo transducer is ideally positioned when it traces a path 40 midway between an odd and an even servo track. When so positioned, the amplitudes of the transistions of the adjacent odd and even tracks as detected by the servo transducer should be equal. If the path traced by the servo transducer moves to one side or the other of the centered path 40, the detected amplitudes of the transitions of one track will rise and those of the other track will fall. Hence, the relative amplitudes indicate the distance the servo transducer is from the center path 40 and the polarity of the stronger transitions indicates the lateral direction of the servo transducer from the centered path.

Figure 3:
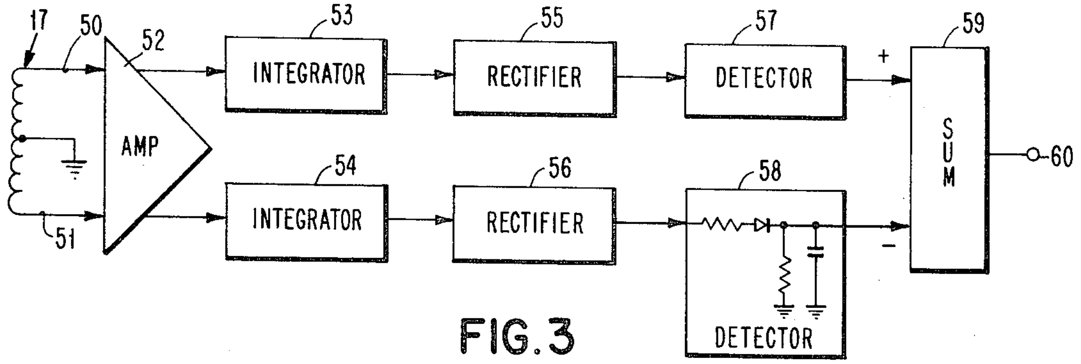
FIG. 3 is a block diagram of circuitry for analyzing the reference patterns of FIG. 2.

An example of circuitry for making such a detection is shown in FIG. 3. In FIG. 3, the servo transducer 17 is represented as a coil having a grounded center tap. The signals detected by the servo transducer are applied to terminals 50 and 51 of double-ended amplifier 52. The outputs of the amplifier are supplied to integrating circuits 53 and 54, respectively. The resultant integrated signals are then rectified by rectifiers 55 and 56 into signals of the same actual polarity, representing the opposite polarity phases of amplifier 52. The amplitudes of the resultant signals are detected, respectively by detectors 57 and 58. These amplitudes are then compared by summing circuit 59, which subtracts the output of detector 58 from the output of detector 57 and supplies the net differnce to output terminal 60.

Figure 4:
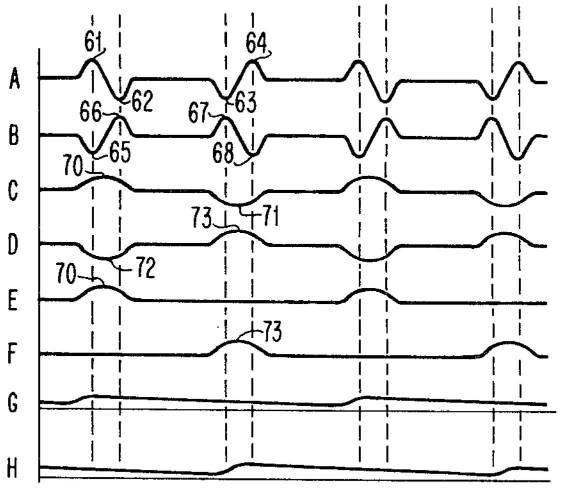
FIG. 4 illustrates waveforms at various points in the circuitry of FIG. 3.

Operation of the circuit when centered between an odd and an even track is illustrated by the waveforms of FIG. 4. The waveforms of FIGS. 4A and 4B represent, respectively, the outputs of head 17 as they appear on lines 50 and 51. Referring to FIG. 4A, peak 61 represents the detection of the first transition 38 from positive to negative magnetic polarity on track 35 and peak 62 represents the following transition 38 from negative to positive magnetic polarity. Negative peak 63 then represents the transition 39 from negative to positive polarity of track 36 and peak 64 represents the following transition 39 from positive to negative polarity. It is seen that the set of signals representing the detection of the sets of two transitions for, respectively, the odd and even tracks are the same in amplitude and in shape, but of opposite polarity. The waveform of FIG. 4B is thus the same as that of 4A, but of opposite polarity.

The wave forms of FIGS. 4A and B are integrated, respectfully, by integrators 53 and 54 to provide as outputs the waveforms of FIGS. 4C and D. As shown by waveform 4C, the peaks 61 and 62 of waveform 4A integrate into the signal positive peak 70. Likewise, the integration of peaks 63 and 64 forms negative peak 71. In this manner, the set of transitions 38 of the odd track 35 have integrated into a positive peak 70, and the set of transitions 39 of the even track 36 have integrated into a negative peak 71. The opposite result is true for waveform 4D as the result of integration of the wavefore 4B. There, the peaks 65 and 66 integrate into negative peak 72 and peaks 67 and 68 integrate into positive peak 73.

The waveforms 4C and D are then rectified, respectively, by half-wave rectifiers 55 and 56. The rectified signals are shown as waveforms 4E and F. As a result of the rectification, only the positive peaks 70 and 73 are transmitted. The transmitted signals are applied to detectors 57 and 58. These detectors are peak detectors that charge to the amplitude of the input peak and discharge very slowly until again charged to the following peak. These detectors thus provide output signals of nearly constant amplitude, wherein the amplitude represents the amplitude of the peaks 70 and 73, respectively. The outputs of detectors 57 and 58 comprise wave forms 4G and H, respectively. These two signals are applied to summation circuit 59 which detects the difference therebetween, if any, and supplies the difference to output terminal 60. Since, in the example employed, the servo transducer 17 is centered between the odd and even tracks 35 and 36, the outputs of detectors 57 and 58 are equal and no net difference appears at output terminal 60.

The net signal appearing at terminal 60 of FIG. 3 comprises the position error output of detection circuitry 35 of FIG. 1.

Figure 5:
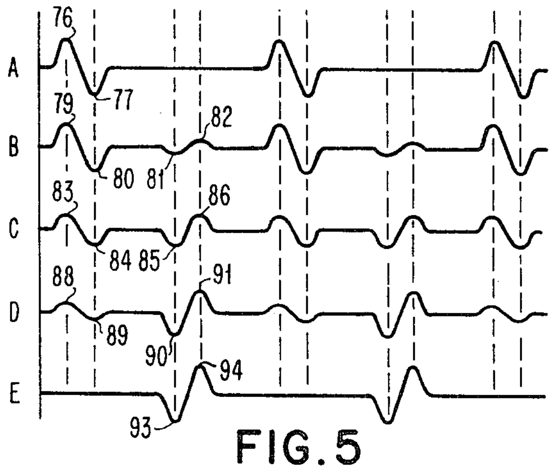
FIGS. 5 and 6 illustrate various waveforms of the circuitry of FIG. 3 obtained by scanning different paths along the reference patterns of FIG. 2.

The waveforms of FIG. 5 represent the outputs of servo transducer 17 on line 50 for various paths of the servo transducer with respect to the odd and even tracks 35 and 36. For example, waveform 5A illustrates the signal appearing on line 50 from servo transducer 17 when the transducer traces the path 75 shown in FIG. 2. The path 75 is positioned towards the center of odd servo track 35 and away from the desired path 40 centered between odd servo track 35 and even servo track 36. As shown by the waveform of FIG. 5A, the servo transducer detects this position by responding to the transitions 38 of odd track 35 by producing high amplitude peaks 76 and 77. The transducer 17 is of such distance from even track 36 that the transitions 39 therein produce no noticeable output from servo transducer 17.

FIG. 5B illustrates the waveform on line 50 of FIG. 3 produced by servo transducer 17 when tracing path 78 of FIG. 2. The servo transducer thus detects the transitions 38 of odd track 35 fairly strongly and provides the signal having peaks 79 and 80 on line 50. The amplitudes of the peaks 79 and 80 of FIG. 5B are slightly less than peaks 76 and 77 of FIG. 5A due to the increased distance of the transducer from the center of track 35. The servo transducer is somewhat closer to even track 36 and therefore detects the transitions 39 of the even track and supplies a signal having peaks 81 and 82 on line 50.

The waveform of FIG. 5C represents the signals produced on line 50 by servo transducer 17 when accurately centered between the odd track 35 and the even track 36, along path 40. The resultant signal produced is identical to that of FIG. 4B, wherein peaks 83 and 84 represent the detected transitions 38 and peaks 85 and 86 represent detected transitions 39. The waveform of FIG. 5D represents the output on line 50 of the servo transducer as it traces path 87 in FIG. 2. In FIG. 5D, peaks 88 and 89, representing the detection of transitions 38, are weak, and peaks 90 and 91, representing detection of transitions 39, are relatively strong. The relative amplitudes are caused by the distance of path 87 from the center of track 35 and the closeness of even track 36. This is brought out more emphatically by the waveform of FIG. 5E, representing the output on line 50 of the servo transducer 17 when tracing path 92. This path is relatively close to the center of even track 36 and, hence, does not even detect transitions 38 of odd track 35. The sole output signal is represented by peaks 93 and 94 which are the output of the servo tranducer from its detection of transitions 39.

Figure 6:
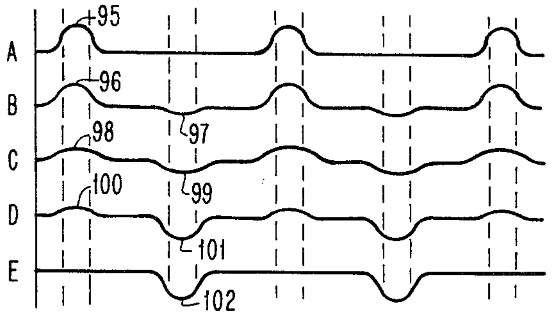

The waveforms of FIG. 6 illustrate the results of integration of the waveforms of FIG. 5. The signals of line 50 as amplified by amplifier 52 are integrated by integrator 53 and then transmitted to rectifier 55. The waveforms of FIG. 6 therefore represent the output of integrator 53.

As shown by FIG. 6A the signals 76 and 77 of FIG. 5A are integrated by integrator circuit 53 to thereby produce the single peak 95. The amplitude of the integrated peak 95 is proportional to the distance of servo transducer 17 from the center of odd track 35 and upon detection thereby of transitions 38. FIG. 6B illustrates the integration of peaks 79 and 80 of FIG. 5B to the single peak 96 and the peaks 81 and 82 into the single peak 97. The relative amplitudes of the peaks 96 and 97 therefore represent the relative distances of the servo transducer 17 from the center of odd track 35 and even track 36 respectively. The peaks 98 and 99 of the waveform of FIG. 6C represent respectively the integration of peaks 83, 84 and of peaks 85, 86 of FIG. 5C. The peaks 98 and 99 are of equal amplitude and therefore indicate that the servo transducer 17 is tracing path 40 half way between odd track 35 and even track 36.

FIG. 6D represents the integration of signals 88, 89 and 90, 91 of FIG. 5D into single peaks 100 and 101. The waveform illustrates the output of integrator 53 when the servo transducer 17 traces path 87 which is offset from desired path 40 towards the center of even track 36. FIG. 6E illustrates the integration by integrator 53 of the waveform 93, 94 of FIG. 5E into the single peak 102. The large amplitude of peak 102 with no signal representing detection of transitions 38 of odd track 35 signals that the servo transducer 17 is tracing path 92 near the center of even track 36.

Referring to FIG. 3, the output waveforms resulting from the operation of integrator 54 is substantially identical to the waveforms shown in FIG. 6 except that the corresponding waveforms are each inverted such that positive peak 95 becomes a negative peak of similar shape and amplitude. Rectifiers 55 and 56 rectify the outputs of the corresponding integrators and thereby transmit only the positive pulses to corresponding detectors 57 and 58. In this manner, rectifier 55 transmits peaks 95, 96, 98 or 100 to detector 57 and rectifier 56 transmits peaks 97, 99, 101 or 102 to detector 58. As shown with respect to FIG. 4, the detectors 57 and 58 charge to the amplitudes of the supplied peaks and provide output signals of nearly constant amplitude to summation circuit 59. Therefore, the output of detector 57 is at a nearly constant amplitude and is the amplitude of either peak 95, 96, 98 or 100. Likewise, the output of detector 58 is constant and is at the amplitude of either peak 97, 99, 101 or 102. The outputs of detectors 57 and 58 are compared by summation circuit 59 and the net difference supplied to output terminal 60.

Referring to FIGS. 2, 3 and 6, as servo transducer 17 traces path 75, the output of summation circuit 59 is equal in amplitude to that of peak 95 and is of positive polarity. As the servo transducer traces path 78, the output of the summation circuit is equal to the difference between the amplitudes of peaks 96 and 97 and is positive in polarity. As the servo transducer traces path 40 which is centered between odd track 35 and even track 36, the net amplitude from summation circuit 59 is zero. Upon the servo transducer tracing path 87, the output of the summation circuit is equal to the difference between peaks 100 and 101 and is negative in amplitude, since peak 101 is the greater of the two. Likewise, upon servo transducer 17 tracing path 92, the output of summation circuit 59 at terminal 60 is equal to the amplitude of peak 102 and is negative in polarity.

Hence, the output signal appearing at terminal 60 from summation circuit 59 indicates by means of its polarity and amplitude the relative position of servo transducer 17 with respect to a path 40 intermediate odd servo track 35 and even servo track 36.

Referring to FIG. 1, the output at terminal 60 comprises the output of detection circuitry 20. This output is transmitted to servo driver 21 and operates the driver to provide a current I to actuator 22. This current is proportional in amplitude and the same polarity as the output from detection circuitry 20. The current drives the actuator 22 to move the servo transducer 17 towards the desired path. In the example given, the desired path lay between odd track 35 and even track 36. Hence, the output of detection circuitry 20 is of proper polarity to control the actuator 22 so as to center the servo transducer 17. However, should it be desired to position the servo transducer 17 intermediate the even servo track 36 and the odd servo track 37, the polarity of the output signal from summation circuit 59 would be the opposite of that required to center the servo transducer. Therefore, a second input 103 is provided to servo driver 21. A signal is provided on this line by track addressing or accessing circuitry (which forms no part of the present invention) when the desired position of servo transducer 17 is between an even and an odd track, such as tracks 36 and 37. No signal is provided when the desired position of servo transducer 17 lies between an odd and an even track, such as between tracks 35 and 36.

Application of a signal on line 103 causes servo driver 21 to reverse the polarity of the output current I. The servo driver therefore provides a current of the same polarity as the position error signal when no signal is supplied on line 103 and supplies a current having a polarity opposite to that of the position error signal when a signal is supplied on line 103. The apparatus of FIG. 1, including the detection circuitry of FIG. 3, therefore continually operates actuator 22 to maintain servo transducer 17 intermediate two adjacent servo tracks.

Figure 7:
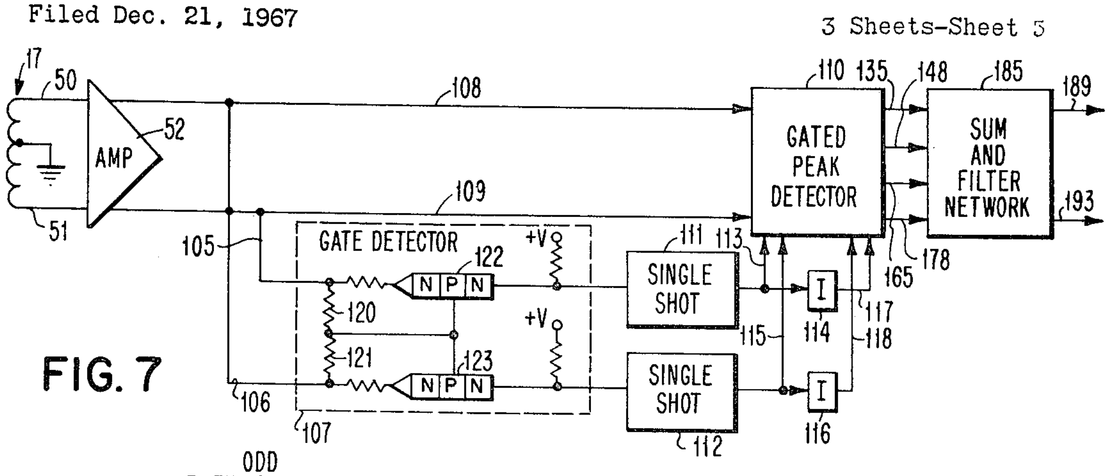
FIG. 7 is a block diagram of alternative circuitry for analyzing the reference patterns of FIG. 2.

Alternative apparatus comprising detection circuitry 20 is shown in FIG. 7. In FIG. 7 the servo transducer 17, its outputs 50 and 51, and the double-ended amplifier 52 are the same as shown previously in FIG. 3. The two, opposite-polarity signals from amplifier 52 are transmitted via lines 105 and 106 to gate detector 107, and via lines 108 and 109 to gated peak detector 110. The gate detector 107 detects positive excursions of signals appearing on either line 105 or line 106 and supplies corresponding signals to single shots 111 or 112, respectively. Each single shot responds to an applied signal by supplying an output of predetermined duration. The output from single shot 111 is transmitted to input 113 of gated peak detector 110 and also to inverter 114. The output of single shot 112 is likewise transmitted to the input 115 of gated peak detector 110 and also to inverter 116. The inverters 114 and 116 are connected to, respectively, inputs 117 and 118 of gated peak detector 110.

Referring to the operation of gate detector 107, signals on input lines 105 and 106 are shown essentially by FIGS. 4A and 4B, respectively. The waveforms of FIGS. 4A and 4B are generally identical but of opposite polarities. Voltage divider 120, 121 maintains the base connections of transistors 122 and 123 at a voltage exactly intermediate the instantaneous voltages of the waveforms of FIGS. 4A and 4B. As shown by FIG. 7, the gate detector 107 is arranged such that transistor 122 conducts when the signal on line 105 is negative and the input on line 106 is positive. Likewise, transistor 123 conducts when the signal on line 106 is negative and the signal on line 105 is positive. Hence, referring additionally to FIGS. 4A and 4B, gate detector 107 responds to peak 61 on line 105 and peak 65 on line 106 by the conduction of transistor 123. Conversely, the gate detector responds to negative peak 62 on line 105 and positive peak 66 on line 106 by the conduction of transistor 122. Conduction by either transistor 122 or 123 causes the corresponding single shot 111 or 112 to provide a positive output pulse of duration T. These output pulses are supplied via lines 113, 115, inverters 114, 116 and lines 117, 118 to gated peak detector 110. The gated peak detector and the supplied waveforms are shown in FIG. 8.

Figure 8A:
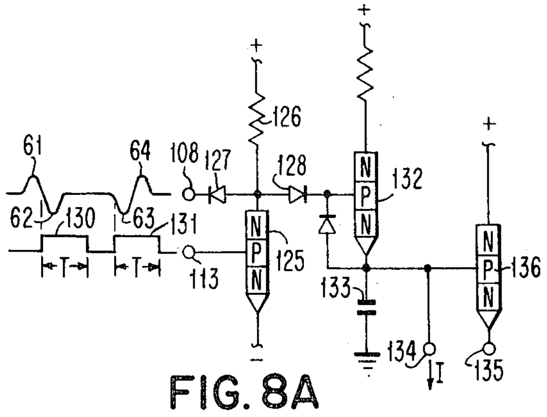
FIGS. 8A–8D schematic diagrams of the gated peak detector of FIG. 7.

Referring to FIG. 8A, a gating network including input 113, transistor 125, resistor 126 and diodes 127, 128 responds to pulses 130 and 131 from single shot 111 by blocking transmission of signals appearing from line 108. Only in the event no signal appears at line 113 does transistor 125 cease conducting so as to transmit the signal appearing at line 108. Such a signal is illustrated by peak 61 which is transmitted to the base input of transistor 132. The transistor then charges capacitor 133 to the peak value of the input voltage. The capacitor essentially maintains its charge, discharging only very slowly via controlled current flow to ground at terminal 134. In discharging, the voltage across the capacitor drops no more than 10% before the following peak 61 is transmitted to transistor 132 to again charge the capacitor. The voltage appearing across capacitor 133 is transmitted to output terminal 135 by emitter follower 136.

Figure 8B:
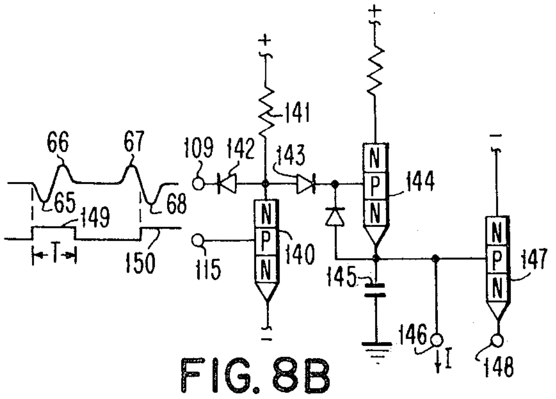

The circuitry of FIG. 8B is identical to that of FIG. 8A, including gating circuitry 140–143, charging transistor 144, capacitor 145, discharge terminal 146, emitter follower 147 and output terminal 148. The sole differences are that input diode 142 is connected to line 109 and the base of gate transistor 140 is connected to line 115 from single shot 112. The gating circuit therefore blocks pulses 65, 66 and 68 and transmits signal 67 to charge capacitor 145.

Figure 8C:
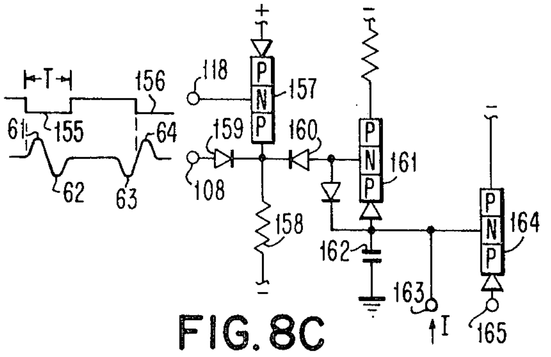

The cricuitry of FIG. 8C is similar to that of the two prior circuits but is of the opposite polarity. Inverted pulses 155 and 156 are supplied at input 118 from inverter 116 to transistor 157. As before, transistor 157 comprises part of a gating circuit which also includes resistor 158 and diodes 159 and 160. The gating circuit responds to negative pulses 155 and 156 to block transmission of signals 61, 62 and 64, but transmits signal 63 to transistor 161 which charges capacitor 162 to the peak negative value of signal 63. The capacitor slowly discharges to gradually become less negative by means of current from terminal 163 until the capacitor is again charged to the peak negative value of the next incoming signal 63. The voltage of capacitor 162 is transmitted by emitter follower 164 to output terminal 165.

Figure 8D:
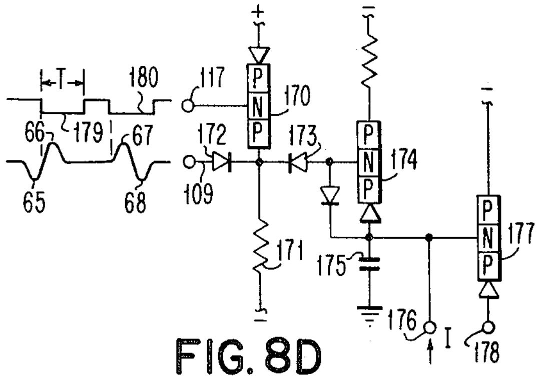

Again, the circuitry of FIG. 8D is identical to that of FIG. 8C, including gating circuitry 170–173, charging transistor 174, capacitor 175, discharging terminal 176, emitter follower 177 and output 178. The sole differences are that the base of gating transistor 170 is connected by input line 117 to inverter 114 so as to respond to pulses 179 and 180 therefrom, and diode 172 is connected to input line 109. The circuitry thus blocks signals 66–68 and charges capacitor 175 to the peak negative value of signal 65 and transmits this value to output terminal 178.

Figure 9:
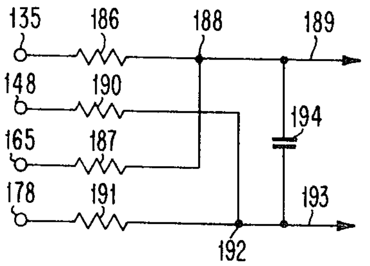
FIG. 9 is a schematic diagram of the sum and filter network of FIG. 7.

Referring additionally to FIGS. 4A and 4B, the circuitry of FIG. 8A supplies the positive value of peak 61 at output terminal 135, the circuitry of FIG. 8D supplies the negative value of peak 65 to output terminal 178, the circuitry of FIG. 8B supplies the positive value of 67 to output terminal 148 and the circuitry of FIG. 8C supplies the negative value of peak 63 to output terminal 165. Referring to FIGS. 7 and 9, the voltages appearing at output terminals 135, 148, 165 and 178 are supplied to sum and filter network 185, shown in FIG. 9.

In FIG. 9, terminals 135 and 165, resistors 186 and 187 and junction 188 comprise a first summing network terminating in output line 189. Terminals 148 and 178, resistors 190 and 191 and junction 192 comprise a second summing network terminating in output line 193. Capacitor 194 filters the output waveform.

The first summing network 186-189 detects the difference in amplitude between the outputs of the peak detector of FIG. 8A and the peak detector of FIG. 8C. Referring additionally to FIGS. 2 and 4, the comparison of the outputs of the circuits of FIGS. 8A and 8C comprises the comparison of the voltage of peak 61 of the waveform of FIG. 4A, representing the amplitude of transition 38 of odd track 35, with the amplitude of negative peak 63 of the waveform of FIG. 4A, representing transition 39 of even track 36. Hence, the resultant difference comprises an indication of the relative distance of transducer 17 from the center of odd track 35 with respect to the center of even track 36.

Similarly, the summation network 190–193 compares the outputs of the circuits of FIGS. 8B and 8D. This comparison is of the amplitude of positive peak 67 of FIG. 4B, representing transition 39 of even track 36 with respect to the amplitude of negative peak 65 of the waveform of FIG. 4B, representing transitions 38 of odd track 35. Thus, the result of this comparison likewise indicates the relative position of servo transducer 17 with respect to the center of odd track 35 versus the center of even track 36. Hence, the amplitude of the outputs of the two summing networks are equal, but of opposite polarity. The voltage between output lines 189 and 193 is therefore approximately twice the amplitude of the voltage at either junction point 188 or 192 with respect to ground.

As described with respect to the apparatus of FIG. 3, the output of the sum and filter network 185 comprises the output of detection circuitry 20. This output is transmitted to servo driver 21 to transmit corresponding current to actuator 22 to drive servo transducer 17 to the desired path intermediate adjacent odd and even servo tracks. Also, as before, the direction of movement of the actuator 22 is controlled by input line 103 to servo driver 21.

Figure 10:
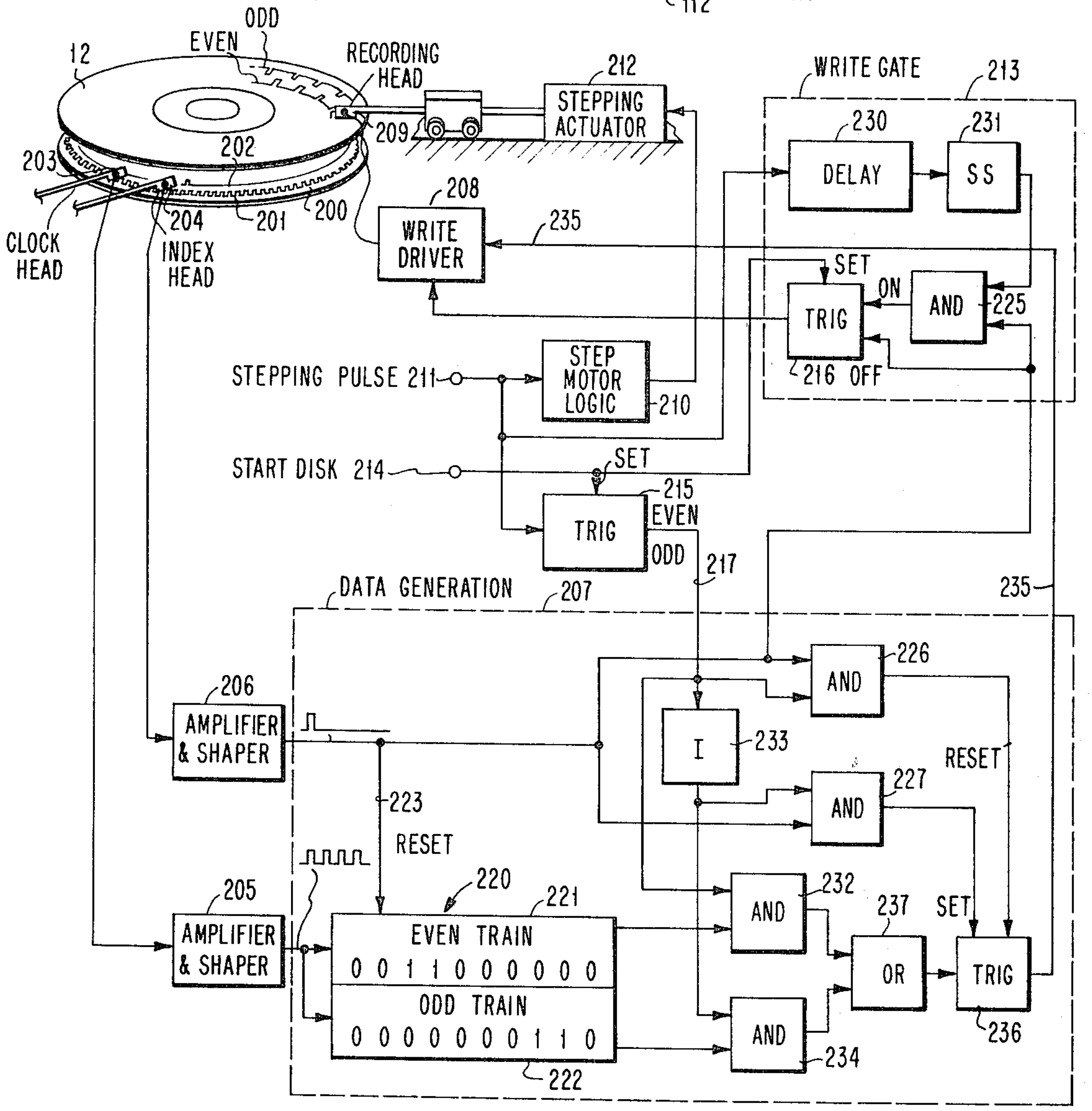
FIG. 10 is a schematic diagram of circuitry for recording the reference patterns of FIG. 2.

FIG. 10 illustrates an example of apparatus which may be utilized to record the servo tracks of FIG. 2 on the servo surface on disk 12 of FIG. 1. In FIG. 10, the disk 12 is mounted so as to rotate synchronously with a clock disk 200. The clock disk 200 includes two tracks 201 and 202. Track 201 is a clock track having a continuous string of clock signals recorded thereon. Track 202 comprises only a single index signal per revolution. Two fixed transducers are provided, a clock head 203 for reading clock track 201, and an index head 204 for reading index track 202. The output of clock head 203 is amplified and shaped by amplifier 205, and the output of index head 204 is amplified and shaped by amplifier circuit 206. The resultant clock signals from amplifier 205 and the index pulse from amplifier 206 are then transmitted to data generation circuitry 207. The data generation circuitry supplies servo signals to a write driver 208 and recording head 209 to thereby write servo tracks on the surface of disk 12. Step motor logic 210, operating under the control of stepping pulses from input terminal 211 controls the operation of stepping actuator 212 to properly position the recording head 209 for recording each of the servo tracks. Stepping pulse input 211 also controls the operation of write gate 213, after initialization by start disk input 214, to control the gating of write driver 208.

The start disk input 214 is connected to the "set" input of trigger 215 and to the "set" input of trigger 216. A set pulse operates trigger 215 so as to provide an "off" output signal on line 217 to data generation circuitry 207. The "off" output signal represents an odd servo track, but the trigger will be switched before the first servo track, which is an event track, is recorded.

The data generation circuitry 207 includes a dual bit ring 220 having two synchronously operating bit rings comprising bit trains 221 and 222. The bit trains comprise the specific bits shown in the drawing. The even bit train 221 comprises the data required to record an even servo track and the odd bit data 222 comprises the information required to record an odd servo track. The dual bit ring is reset by an index pulse from index transducer 204 appearing at "reset" input 223. Resetting the dual bit ring 220 causes it to assume the exact bit sequences shown. The dual bit ring then responds to pulses received from clock transducer 203 to advance one bit position for each clock pulse.

The index pulse detected by index transducer 204 is also transmitted to AND circuit 225, AND circuit 226, AND circuit 227 and to the "off" input of trigger 216.

After the initial start disk signal is received on input 214, the initiali stepping pulse is received at input 211. This pulse is transmitted to delay 230, to step motor logic 210, and to trigger 215. The pulse operates step motor logic 210 so as to supply the proper signals to stepping actuator 212 to cause recording transducer 209 to be stepped to the first servo track. Delay 230 is of sufficient time to allow for the motion of recording head to be completed before the transmitting the stepping pulse to single shot circuit 231. The single shot then supplies an enabling pulse to AND circuit 225. This enabling pulse is of duration greater than one revolution of the disks and less than two revolutions. The stepping pulse also operates trigger 215 so as to switch to the opposite state and thereby supply an "on" output signal on line 217. As mentioned before, the output of trigger 215 now represents an even servo track. This signal is transmitted to the enabling input of AND circuit 226, the enabling input of AND circuit 232, and to inverter 233. The output of inverter 233 is therefore switched to the "off" state, which signal is supplied to the enabling input of AND circuit 227 and to the enabling input of AND circuit 234. The operation of trigger 215 and inverter 233 therefore causes AND circuits 226 and 232 to be enabled and AND circuits 227 and 234 to be disabled.

Operation of the system then awaits the first subsequent index pulse detected by index transducer 204. This pulse is transmitted as before to the "reset" input 223 of dual bit ring 220 to AND circuts 225, 226, and 227, and to the "off" input of trigger 216. The pulse again resets dual bit ring 20. Since trigger 216 has already been reset "off" the pulse appearing at the "off" input thereto has no effect. Further, the input to AND circuit 225 which is now enabled by the signal from single shot 231 is therefore transmitted to the "on" input of trigger 216. This causes the trigger to be reset "on" and supply a write gate signal to write driver 208. This allows any subsequent data appearing on line 235 to be transmitted to the recording transducer 209. As stated previously, AND circuit 226 has been enabled while AND circuit 227 has been disabled. Therefore, the index pulse is transmited by AND circuit 226 to the reset input of trigger 236. This causes the trigger to be reset "off" and supply an "off" signal on line 235 to write driver 208. The write driver therefore writes a signal of negative magnetic polarity on the even servo track. This area of negative magnetic polarity is shown by the area having a minus (−) designation as shown by even track 36 in FIG. 2.

Then, subsequent clock pulses detected by clock transducer 203 are supplied to the dual bit ring 220 to advance the ring one bit position for each clock pulse. The outputs of the even bit train are supplied to AND circuit 232 and the inputs of the odd bit train are supplied to AND circuit 234. As stated previously, trigger 215 and inverter 233 have caused the enabling of AND circuit 232 and the disabling of AND circuit 234. Therefore, the output of even train 221 is transmitted by AND circuit 232 to OR circuit 237.

The "zero" outputs of even train 221 have no effect on trigger 236. The first "one" bit, however, causes the trigger to change state and produce an "on" output on line 235. This output signal causes the write driver 208 and recording transducer 209 to switch polarity and record a positive (+) magnetic polarity signal on the servo track. The immediately following bit from even train 221 is also a "one," causing the trigger 236 to again change state. Hence, the write driver again switches magnetic polarity and causes the transition of the recorded signal back to negative magnetic polarity. The recording of the even servo track thus continues to produce a signal of normally negative magnetic polarity subject to periodically occurring sets of two flux reversals or transitions 39 as shown in FIG. 2.

Upon completion of one revolution of the disks and completion of the recording of the even servo track, index transducer 204 again detects an index pulse. This pulse again resets the dual bit ring 220, and again appears at the "off" input of trigger 216, thereby resetting the trigger off and terminating the write gate signal to write driver 208. The index pulse is also transmitted to the "reset" input of trigger 236. The resetting of trigger 236 has no effect on the servo surface since the termination of the write gate to write driver 208 prevents further writing of data on the disk surface.

Operation of the system is thus suspended until the next stepping pulse is received at input 211. The stepping pulse is then again supplied to delay 230, trigger 215 and step motor logic 210. The step motor logic causes the stepping actuator to move the recording transducer 209 to the next servo track. The trigger 215 then switches to the "off" state, representing an odd servo track, and thereby disables AND circuits 226 and 232. Inverter 233 responds by then enabling AND circuits 227 and 234. After the recording head 209 is positioned at the next servo track, relay 230 supplies the stepping pulse to single shot 231. The single shot then enables AND circuit 225 for the predetermined time period. Subsequently, index transducer 204 supplies an index pulse to AND circuit 225, which is thereby transmitted to again turn on trigger 216. The trigger then supplies a write gate signal to write driver 208, causing the driver to transmit data to recording transducer 209. The index pulse is also transmitted by enabled AND circuit 227 to set trigger 236 to the "on" state. This signal causes the right driver 208 and recording transducer 209 to record the servo track at a positive magnetic polarity (shown as a plus sign in odd servo track 35 of FIG. 2). In addition, the index pulse resets the dual bit ring 220. Subsequently, the clock signals detected by clock transducer 203 step the dual bit ring. Since AND circuit 234 is enabled, the odd train 222 of bits is transmitted by the AND circuit and by OR circuit 237 to trigger 236. As before, the "zero" bits have no effect on the trigger. The first "one" bit, however, causes the trigger to change to the "off" state and thereby causes recording transducer 209 to switch to the negative magnetic polarity. The immediately following "one" bit of the odd train 222 then switches trigger 236 back to the "on" state and switches recording transducer 209 to the positive magnetic polarity. This action is shown by reference to the odd servo track 35 of FIG. 2 wherein the track comprises normally positive magnetic polarity subject to periodically occurring sets of two flux reversals 38.

The recording of alternate odd and even servo tracks therefore continues until all tracks have been recorded. At this time the system is shut down and the recorded servo disk 12 removed.

It is seen that by use of a clocking disk 200 which rotates synchronously with the servo surface, and the dual bit ring 220, the sets of transitions of the odd servo tracks occur at approximately the midway point between the corresponding sets of transitions of the even servo tracks over the entire servo surface.

It should be obvious to those skilled in the art that other means of recording the servo tracks in the manner shown may easily be employed.

While the invention has been particularly shown and described with reference to preferred embodiments thereof, it will be understood by those skilled in the art that various changes in form and details may be made therein without departing from the spirit and scope of the invention.

We claim:

1. In a system for indicating position with respect to a predetermined path, means for marking said path, comprising:

a first track adjacent one side of said path, said track comprising a designation of a first type interrupted by relatively short designations of a second type, and a second track adjacent the other side of said path, said track comprising a designation of said second type interrupted by relatively short designations of said first type, said short designations appearing opposite said designations of said first type of said first track.

2. The means of claim 1 for marking said path, additionally including means for marking a second path parallel to said first path, wherein:

said second track lies between said paths and is adjacent to both; and including a third track adjacent the other side of said second path, said track comprising said designation of said first type interrupted by relatively short designations of said second type, and said short designations appearing opposite said designations of said second type of said second track.

3. The apparatus of claim 1 wherein:

said tracks comprise magnetically recorded tracks, said designations of said first type comprise a magnetic flux of a first directional orientation; and said designations of said second type comprise a magnetic of a second directional orientation.

4. The apparatus of claim 1 wherein:

said tracks comprise magnetically recorded tracks, said designations of said first type comprise a magnetic flux of a first polarity; and said designations of said second type comprise a magnetic flux of the opposite polarity.

5. The apparatus of claim 1 wherein:

said short designations are separated by a distance greater than three times the normal length of said short designations; and each of said short designations of said second track appear generally half-way between the two nearest of said short designations of said first track.

6. The apparatus of claim 1 wherein:

said first track comprises a designation of said first type interrupted by sets of at least one relatively short designation of said second type; and said second track comprises a designation of said second type interrupted by sets of at least one relatively short designation of said first type, said sets of short designations of said second track appearing opposite said designations of said first type of said first track.

7. The apparatus of claim 1 wherein:

said first track comprises a magnetic flux of a first polarity subject to periodically occurring sets of polarity reversals; and said second track occurring opposite said first polarpolarity subject to periodically occurring sets of polarity reversals, said sets of polarity reversals of said second track occurring opposite said first polarity magnetic flux of said first track.

8. The apparatus of claim 7 for marking said path, additionally including means for marking a second path parallel to said first path, wherein:

said second track lies between said paths and is adjacent to both; and including a third track adjacent the other side of said second path, said track comprising said first polarity magnetic flux subject to periodically occurring sets of polarity reversals, said sets of polarity reversals occurring opposite said reverse polarity magnetic flux of said second track.

9. The apparatus of claim 7 wherein: each said set of polarity reversals comprises a plurality of flux reversals occurring at data bit density.

10. The apparatus of claim 7 for marking a plurality of said predetermined paths additionally including: a plurality of said first tracks and a plurality of said second tracks, said tracks situated alternately across a surface and defining said paths between said tracks, said sets of polarity reversals of each said first track occurring opposite said reverse polarity magnetic flux of said second tracks that are immediately adjacent said first track, and said sets of polarity reversals of each said second track occurring opposite said first polarity magnetic flux of said first tracks that are immediately adjacent said second track.

11. The apparatus of claim 7 wherein: each of said sets of polarity reversals comprises an even number of polarity reversals.

12. The apparatus of claim 11 wherein: each said set of polarity reversals comprises two polarity reversals.

13. The apparatus of claim 12 wherein:

said sets of polarity reversals are separated by a distance greater than three times the normal distance between the polarity reversals comprising each said set; and each of said polarity reversal sets of said second track appear generally intermediate the two nearest of said polarity reversal sets of said first track.

14. Apparatus for generating an indication of position with respect to a predetermined path, comprising:

a first track adjacent one side of said path, said track comprising a designation of a first type interrupted by relatively short designations of a second type; and a second track adjacent the other side of said path, said track comprising a designation of said second type interrupted by relatively short designations of said first type, said short designations appearing opposite said designations of said first type of said first track;

transducing means for detecting said designations of said tracks, wherein the amplitude of detection of each track and of the output therefrom is related to the lateral distance of said transducer from said track;

separation means responsive to said detected designations for separating said output from said transducing means into two types of signals representing, respectively, said first and second tracks; and comparison means for comparing the amplitudes of said two types of signals and supplying an indication of the stronger of the two types of signals and the amplitude of the difference therebetween, said indication thereby representing the lateral direction and distance of said path from said transducing means.

15. The apparatus of claim 14 wherein:

said first track comprises a magnetic flux of a first polarity interrupted by periodically occurring sets of polarity reversals;

said second track comprises a magnetic flux of reverse polarity interrupted by periodically occurring sets of polarity reversals, said sets of polarity reversals of said second track occurring opposite said first polarity magnetic flux of said first track;

said transducing means detects said polarity reversals of said tracks and provides output signals indicating the direction of each detected polarity reversal, wherein the amplitude of each output signal is related to the lateral distance of the transducer from the track containing said polarity reversal; and said separation means is responsive to said detected porality reversals for separating said transducing means output into said two types of signals.

16. The appaartus of claim 15 arranged to generate an indication of positon with respect to a selected one of two predetermined paths, wherein:

said second track lies between said paths and is adjacent to both; and said apparatus additionally includes:

a third track adjacent the other side of said second path, said track comprising said first polarity magnetic flux interrupted by sets of polarity reversals, said sets of polarity reversals occurring opposite said reverse polarity magneic flux of said second track;

means causing said transducing means to be positioned approximately at said selected one of said two predetermined paths; and orientation means responsive to said selection for causing said indication to be properly oriented.

17. The apparatus of claim 15 wherein:

each of said sets of polarity reversals comprises an even number of polarity reversals;

said separation means responds to said output of said transducing means to convert said detected polarity reversals into two classes of signals, the class being dependent upon the direction and sequential position of each said polarity reversal, each class of signal thereby representing one of said tracks and the amplitude thereof being related to the amplitude of the corresponding detected polarity reversal, said two classes of signals representing, respectively, said first and second tracks; and said comparison means compares said amplitudes of said two classes of signals and supplies an indication of the stronger of the two classes of signals and the amplitude of the difference therebetween, said indication thereby representing the lateral direction and distance of said path from said transducing means.

18. The apparatus of claim 17 arranged to center said transducing means laterally with respect to said predetermined path, said apparatus additionally comprising: drive means for moving said transducing means laterally with respect to said path, said drive means being responsive to said indication from said comparison means to move said transducing means in the direction of and with a force related to the amplitude of said indication.

19. The apparatus of claim 18 additionally arranged as a track-following servo system to align a plurality of data transducers with respect to corresponding data paths, wherein: said predetermined path is aligned with respect to said data paths such that said centering of said transducing means laterally with respect to said predetermined path causes said data transducers to each be approximately centered with respect to the corresponding data path.

20. The apparatus of claim 19 arranged as a track-following servo system in a rotating disk file data storage system, wherein said system additionally includes:

a plurality of magnetic disk surfaces concentrically mounted with respect to a central axis and rotated synchronously about said axis and wherein;

each of said paths comprise a circular path on a different one of said magneic disk surfaces so that said paths define a right cylindrical surface having an axis coextensive with said central axis, and said transducing means and said data transducers are aligned so as too be parallel to said axis of said cylindrical surface, and said transducing means and said data transducers are arranged to cooperate with said corresponding predetermined path and data paths, respectively, such that said centering of said transducing means laterally with respect to said predetermined path causes said data transducers to each be approximately centered with respect to the corresponding data path.

21. The apparatus of claim 17 wherein:

said separation means responds to said output of said transducing means to separate said detected polarity reversals into two classes of signals, the class being dependent upon the direction and sequential position of each said polarity reversal, each class of signal thereby representing one of said tracks;

said apparatus additonally comprises:

peak detection means for detecting the amplitudes of selected peaks of said classes of signals and supplying at output terminals approximately D.C. representations of the ampiltudes of said peaks; and wherein:

said comparison means compares said D.C. representations from said output terminals of said peak detection means to thereby provide an indication of the stronger of the two classes of signals and the amplitude of the difference therebetween, said indication thereby representing the lateral direction and distance of said path from said transducing means.

22. The apparatus of claim 21 wherein:

said transducing means provides on two output lines, separate output signals of equal amplitude and opposite polarity for each detected polarity reversal, each such signal comprising a complete A.C. waveform; and said separation means comprises:

integration means for separately integrating from said output lines said output signals of said transducing means to thereby convert said output signals into half-wave waveforms;

first half-wave rectifier means for transmitting out of those of said half-wave waveforms resulting from output signals of one of said two output lines, only those of one polarity and blocking those of the other polarity, said transmitted waveforms comprising said first class; and second half-wave rectifier means for transmitting out of those of said half-wave waveforms resulting from the second of said two output lines, only those of one polarity and blocking those of the other polarity, said transmitted waveforms comprising said second class of signals.

23. The apparatus of claim 22 arranged to generate an indication of position with respect to a selected one of a plurality of predetermined paths, additionally comprising:

a plurality of said first tracks and a plurality of said second tracks, said tracks situated alternately across a surface and defining said paths between said tracks, said sets of polarity reversals of each said first track occurring opposite said reverse polarity magnetic flux of those second tracks that are immediately adjacent said first track, and said sets of polarity reversals of each said second track occurring opposite said first polarity magnetic flux of those first tracks that are immediately adjacent said second track;

accessing means for approximately positioning said transducing means at said selected path; and orientation means responsive to said selection for selectively inverting the direction of said indication.

24. A method of generating position indicating signals comprising the steps of:

fashioning a plurality of adjacent tracks, such that a line centered between two adjacent tracks represents a constant positional indication, wherein each track is fashioned with a predetermined normal polarity subject to periodically occurring sets of polarity reversals, adjacent tracks having opposite predetermined normal polarity;

sensing, along a line essentially parallel to said centered line, said polarity reversals of said tracks immediately adjacent said centered line, wherein the sensing amplitude is dependent upon the lateral distance from the sensing line to the center of the track having the sensed polarity reversal;

separating said sensed polarity reversals into two categories dependent upon the direction and sequential position of each said detected polarity reversal, each of said categories thereby representing one of said two immediately adjacent tracks; and comparing the peak amplitudes of said two categories of detected polarity reversals to derive a net difference, the amplitude and polarity of said net difference thereby indicating the lateral direction and distance of said centered line from said sensing line.

25. The method of claim 24 for additionally centering a sensing means laterally with respect to said centered line, wherein:

said sensing step is accomplished by said sensing means; and additionally including the step of:

moving said sensing means laterally in response to said net difference derived by said comparison.

26. The method of claim 25 for centering said sensing means laterally with respect to a selected one of a plurality of said centered lines, comprising the additional steps of:

initially positioning said sensing means at a point laterally closer to said selected centered line than any other one of said centered lines; and orienting, in response to said selection, said net difference derived by said comparison by selectively inverting said net difference.

References Cited

UNITED STATES PATENTS

| | | | |
|---|---|---|---|
| 2,729,809 | 1/1956 | Hester | 340—174.1 |
| 3,156,906 | 11/1964 | Cummins | 340—174.1 |
| 3,185,972 | 5/1965 | Sippel | 340—174.1 |
| 3,292,168 | 12/1966 | Gray | 340—174.1 |

BERNARD KONICK, Primary Examiner

W. F. WHITE, Assistant Examiner

U.S. Cl. X.R.

179—100.2

Disclaimer 3,534,344.—*George R. Santana*, Saratogo, Calif. METHOD AND APPARATUS FOR RECORDING AND DETECTING INFORMATION. Patent dated Oct. 13, 1970. Disclaimer filed Aug. 9, 1971, by the assignee, *International Business Machines Corporation*.

Hereby enters this disclaimer to claims 1, 2, 3, 4, 6, 7, 8, 10, 11 and 12 of said patent.

[*Official Gazette November 2, 1971.*]